United States Patent [19]

Kusakawa et al.

[11] 4,305,082

[45] Dec. 8, 1981

[54] ELECTRIC RECORDING SYSTEM AND ELECTRIC HEAT RECORDING SHEET

[75] Inventors: Hideaki Kusakawa; Kenzo Takahashi; Koichi Tomura; Masaru Ohnishi; Kumiko Nakajima, all of Amagasaki, Japan

[73] Assignee: Mitsubishi Denki Kabushiki Kaisha, Tokyo, Japan

[21] Appl. No.: 78,047

[22] Filed: Sep. 24, 1979

Related U.S. Application Data

[63] Continuation of Ser. No. 860,201, Dec. 13, 1977, abandoned.

[30] Foreign Application Priority Data

Dec. 13, 1976 [JP] Japan ................................ 51-150112
Dec. 13, 1976 [JP] Japan ................................ 51-150113
Dec. 18, 1976 [JP] Japan ................................ 51-152478

[51] Int. Cl.[3] ........................ G01D 15/34; G01D 15/10
[52] U.S. Cl. ................................ 346/135.1; 346/76 R
[58] Field of Search .............. 346/76 R, 76 PH, 135.1

[56] References Cited

U.S. PATENT DOCUMENTS 2,664,043 12/1953 Dalton ......................... 346/135.1 X
3,441,940 4/1969 Salaman et al. .............. 346/76 R X
3,512,174 5/1970 Schwarzer ......................... 346/76 R
3,632,969 1/1972 Walkow ...................... 346/76 PH X
3,847,265 11/1974 Ehretsmann et al. ...... 346/76 PH X
3,857,470 12/1974 Bastard et al. ............... 346/135.1 X

*Primary Examiner*—George H. Miller, Jr.
*Attorney, Agent, or Firm*—Oblon, Fisher, Spivak, McClelland & Maier

[57] ABSTRACT

An electric recording system is a novel recording system using an electric heat recording sheet comprising an electric conductive layer and an electric resistant layer, and heating the electric resistant layer by feeding a signal current to the recording sheet by contacting an electrode needle with the recording sheet and recording symbols or figures on the recording medium (e.g., commercial thermo-sensitive paper) through the electric conductive layer.

In the other embodiment of the electric heat recording sheet, an electric resistant layer is formed on one surface of an electric conductive layer and an ink layer is formed on the rear surface of the electric conductive layer whereby heat is transferred from the electric resistant layer to print shape image by printing a part of the ink layer on the recording medium, such as a regular paper.

In the improved embodiment of the electric heat recording sheet, an electric resistant layer is formed on one surface of the electric conductive layer and a dielectric layer of a polymer film is formed on the rear surface of the electric conductive layer whereby the electric heat recording sheet having excellent recording characteristics and durability is prepared.

12 Claims, 6 Drawing Figures

ELECTRIC RECORDING SYSTEM AND ELECTRIC HEAT RECORDING SHEET

This is a continuation of application Ser. No. 860,201, filed Dec. 13, 1977, now abandoned.

BACKGROUND OF THE INVENTION

1. Field of the Invention

The present invention relates to an electric recording system for recording images on a recording medium such as the commercial thermo-sensitive paper.

2. Description of Prior Art

Various methods of recording images on a sheet of a recording medium have been known as follows.

Primary coloring systems wherein a recording medium has a color developing layer (primary coloring) and images are recorded depending upon the energy data applied by various manners.

Secondary coloring systems such as a method of forming latent images on a recording medium and then coloring the images with a developing agent e.g. toner and a method of forming images on a transferring sheet and then, printing the images on a parmanent recording medium.

The primary recording systems include a discharge recording system, an electrolytic recording system and an electric recording system for forming images by electric energy through a recording needle as well as a heat sensitive recording system for forming images by using heat energy given by a heated pen.

The primary coloring systems have advantages that the structure of the recording device is simple and can be easily formed in compact and economical manner because the recording medium itself has the color developing layer. On the contrary, it is disadvantageously necessary to coat the color developing layer on the recording medium and the cost is high and the processing cost is high.

The heat sensitive recording system is considered to be useful as the recording system for a facsimile and a commutor printer because of low cost of the recording paper in comparison with another primary color developing system.

The conventional thermal heads for thermal printers include three types of a thin film type, a thick film type and a semiconductor type which have certain disadvantages.

In order to prevent wearing of the thermal head caused by sliding on the thermo-sensitive paper, the heat transfer for the recording is performed through a wear-resistant layer. In the thin film type and the thick film type of thermal head, an electrode layer and a resistant layer are formed on a ceramic substrate by a metal deposition, etc. whereby the heat response is too slow.

On the other hand, the electrostatic recording electro photography has been proposed as the secondary coloring system.

The latter system has the advantages that when a toner printing system is employed, a regular paper and plastic sheet can be used as the recording medium whereby the processing cost is low and the recording medium can be selected from various ones. On the contrary, the structure of the recording device is complicated whereby the device is not easily miniaturized and is expensive.

As described above, in the conventionl recording systems, the miniaturization and the cost-down of the recording devices cause the cost-up of the processings.

SUMMARY OF THE INVENTION

It is an object of the present invention to provide a novel electric recording system for recording electric signals as symbols or figures on a thermo-sensitive recording paper, and a regular paper.

It is another object of the present invention to provide a novel electric recording system which can be attained by using an economical recording paper and a miniaturized and economical recording device.

It is the other object of the present invention to provide an improved electric heat recording sheet which is suitable for the novel electric recording system.

The other object of the present invention is to provide an electric heat recording sheet wherein an ink layer is printed on a recording paper by the electric heating to form sharp images.

The other object of the present invention is to provide an electric heat recording sheet which has excellent recording characteristics and durability.

The foregoing and other objects of the present invention have been attained by providing an electric recording system which comprises superposing an electric heat recording sheet which is heated by feeding a current, on a recording medium; feeding a current in the electric heat recording sheet by using an electrode; converting the current passing in the electric heat recording sheet to Joule heat; and transferring the latent heat image on the recording medium to form visible image.

DETAILED DESCRIPTION OF PREFERRED EMBODIMENTS

Figure 1:
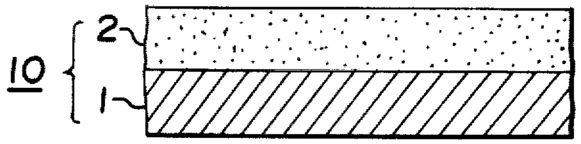
FIG. 1 is a sectional view of a part of one embodiment of an electric heat recording sheet used in the present invention.

An electric heat recording sheet (10) having the structure shown in FIG. 1 is prepared. The reference numeral (1) designates a conductive layer such as metal foil; (2) designates an electric resistant layer which has a resistance being higher than that of the conductive layer for more than one order and is film formability and the electric resistant layer (2) can be a coating of an electric conductive paint or a semiconductor deposited layer.

Figure 2:
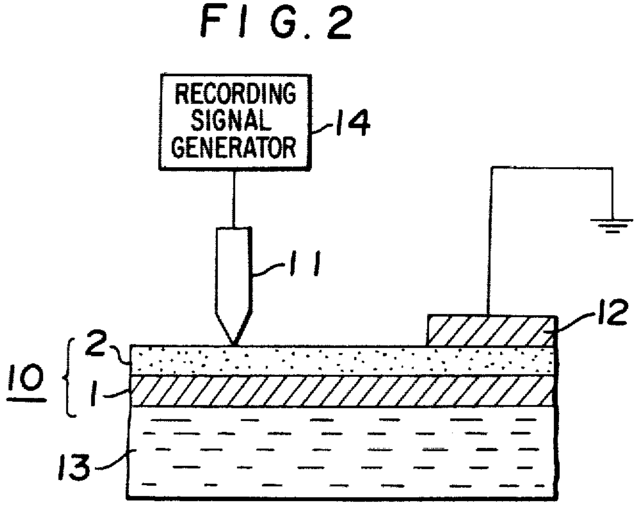
FIG. 2 is a schematic view showing a recording condition by using the electric heat recording sheet of FIG. 1.

FIG. 2 shows one embodiment of the recording system using the electric heat recording sheet (10) of FIG. 1. The reference numeral (1) designates an electric conductive layer; (2) designates an electric resistant layer; (11) designates an electrode needle for recording; (12)

designates a paired electrode which is earthed; (13) designates a commercial thermo-sensitive recording paper and (14) designates a recording signal generator.

The transferring of heat by the recording system is performed as follows.

A DC voltage of 2 to 50 V is applied to the electrode needle (11) for recording. When the resistance of the electric resistant layer (2) is made of a resistor having higher than $10^2\Omega$ cm, arc is discharged between the electrode needle (11) and the electric resistant layer (2) to burn the electric resistant layer (2). When the electric resistant layer (2) is made of a resistor having lower than $10^\circ\Omega$ cm, the electric resistant layer (2) is heated by applying only about 5 V. In these cases, the heat is caused by the arc discharge as the current passes between the electrode needle (11) and the electric conductive layer (1) and the heat is transferred through the electric conductive layer (1) to record the signals on the heat sensitive recording paper (13).

The first embodiment will be further illustrated by certain examples.

EXAMPLE 1 in a ball mill, 500 g of acrylic resin paint having a solid content of 40% and 20 g of carbon black (Diablack SH manufactured by Mitsubishi Chemical Ind. Ltd.) were charged and mixed for 5 hours to prepare an electric conductive paint. The resistance of the electric conductive paint was $10^{3\Omega}$ cm.

On the other hand aluminum foil having a thickness of 20 μm was prepared and the electric conductive paint was coated on the aluminum foil by a wire bar to form an electric resistant layer having a thickness of 20 μm whereby an electric heating recording sheet (10) was prepared.

Electrode needles (11) were respectively prepared by bending phosphor bronze wires having a diameter of 0.5 $^{mm}$, 0.3 $^{mm}$ or 0.2 $^{mm}$ in a hook shape. Each electrode needle (11) was connected to a recorder and the thermo-sensitive recording paper (13) (manufactured by Jujo Seishi K.K.) was superposed to the electric heating recording sheet (10) as a recording superposed paper to set them in the recorder.

The recording superposed paper was fed at a rate of 10 mm/sec. and voltage of 50 V was applied to the electrode needles (11). The currents of 150 mA to 200 mA were respectively passed through these electrode needles having different diameters to arc discharge whereby the electric resistant layer was burnt. On the thermo-sensitive recording paper, the recorded lines of 0.3, 0.2 and 0.15 were respectively recorded through the electrode needles.

EXAMPLE 2

In a ball mill, 500 g of acrylic resin paint having a solid content of 40% and 120 g of carbon black (Diablack SH manufactured by Mitsubishi Chemical Ind. Ltd.) were charged and mixed for 6 hours to prepare an electric conductive paint. The resistance of the electric conductive paint was $10^{-1\Omega}$ cm.

The electric conductive paint was coated on an aluminum foil having a thickness of 15 μm to form an electric resistant layer having thickness of 20 μm whereby an electric heating recording sheet was prepared.

The test of Example 1 was repeated by using the recording sheet.

When the voltage of 5 V was applied to the electrode needle, the current of about 150 mA was respectively passed through the electrode needles having different diameter whereby the current passes were recorded on the heat sensitive recording paper without any arc discharge. The non-arc discharged electric heating recording sheet could be used for several times.

EXAMPLE 3

In accordance with the process of Example 1 except mixing 500 g of acrylic resin paint having a solid content of 40% with 180 g of conductive zinc oxide and using the electric conductive paint for the electric resistant layer, the electric heating recording sheet was prepared. The recording was attained by the arc discharge.

EXAMPLE 4

In accordance with the process of Example 2, except forming stannic oxide layer having a thickness of 2 μm as the electric resistant layer by the depositing method, the electric heating recording sheet was prepared.

The recording sheet was fixed so as not to relatively move to the electrode needle and the voltage of 8 V was applied to pass the current of 50 mA and the heat sensitive recording paper was run at a rate of 20 mm/sec, whereby a line image was given on the recording paper.

Figure 3:
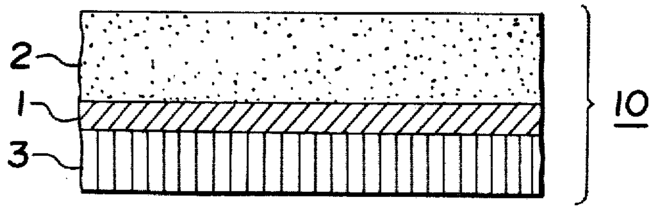
FIG. 3 is a sectional view of a part of the other embodiment of an electric heat recording sheet.

FIG. 3 shows the other embodiment of the present invention wherein the structure of the electric heat recording sheet (10) is improved.

The electric heat recording sheet (10) comprises the electric conductive layer (1), the electric resistant layer (2) and also an ink layer (3) containing a pigment or a dye which is formed on the rear surface of the electric conductive layer (1).

The electric resistant layer (2) preferably has a volume electric resistance of $10^\circ$–$10^{1\Omega\cdot}$ cm because of high calorific value and high density of the recorded image.

When the resistance is higher than $10^{2\Omega\cdot cm}$, the arc discharge is caused and it can be used only for one time though the printing function is the same with those of non-arc discharge cases.

The electric resistant layer (2) can be a coated film of a composition dispersing electric conductive fine particles in a binder of a resin; an electric conductive polymer film or a combination thereof.

The electric conductive fine particles can be semiconductive zinc oxide, semiconductive titanium dioxide, cupper iodide and carbon black.

The binders can be butyral resin, polycarbonate, acrylic resin, and methacrylic resin.

The electric conductive polymers can be cationic polyelectrolytes such as polypiperidinium chloride and polyvinyl benzyl trimethyl ammonium chloride.

When an electric conductive sheet having high mechanical strength is used for the electric resistant layer, metal deposited layer of aluminum or chromium can be used as the electric conductive layer.

When the electric resistant layer has not high mechanical strength, a metal foil such as aluminum foil is used.

The ink layer (3) can be prepared by coating, in a thickness of several microns, a composition prepared by blending a pigment such as aniline black and phthalocyanine blue or a sublimation dye such as Sumicalone Violet 3BL, Dianic Navy blue ER-FS; Oraset Blue-B and Oil Black FBB to a vehicle such as paraffin wax, epoxy resin (Epikot 1002) and K-54 RS medium (Toyo Ink K.K.).

The electric heat recording sheet (10) with the ink layer is superposed to a regular paper (13) as described referring to FIG. 2 and the current fed from the record signal generator (14) is passed from the recording electrode (11) through the electric resistant layer (2) and the electric conductive layer (1) to the pair electrode (12) whereby the current is converted to Joule heat at the electric resistant layer (2) below the recording electrode (11) and the vehicle of the ink layer (3) is melted to print the ink on the regular paper (13) to form the image on the regular paper. When the recording medium is plastic sheet, the image having high wearing resistance can be formed.

The second embodiment will be further illustrated by certain examples.

EXAMPLE 5

A composition was prepared by dissolving butyral resin containing 30 wt. % of semiconductive titanium dioxide in suitable amount of ethyl acetate. The composition was coated on an aluminum foil having a thickness of 6 microns by the wire bar method to form an electric resistant layer having a thickness of 20 microns.

An ink composition was prepared by blending 1 wt. part of Sumikalon Violete 3BL, 10 wt. parts of K-54RS medium and 10 wt. parts of tetrahydrofuran. The ink composition was coated on the rear surface of the aluminum foil by the wire bar method and dried to form an ink layer having a thickness of 5 microns. Thus, the electric printing recording sheet was obtained and it was superposed to a regular paper and the current is passed through the recording electrode to cause arc discharge between the electrode and the electric resistant layer. A shape image could be formed on the regular paper by feeding a current of 200 mA at a voltage of 50 V.

EXAMPLE 6

A composition was prepared by dissolving methacrylic resin containing 30 wt. % of carbon black in methyl ethyl ketone. The composition was coated on an aluminum foil having a thickness of 6 microns by the wire bar method to form an electric resistant layer having a thickness of 20 microns.

An ink composition was prepared by blending 1 wt. part of Sumikalon Violet 3BL, 10 wt. parts of K-54RS medium and 10 wt. parts of tetrahydrofuran. The ink composition was coated on the rear surface of the aluminum foil by the wire bar method and dried to prepare an electric print recording sheet. The recording sheet was superposed to a polyester sheet and a shape image could be formed on the polyester film by feeding a current of 200 mA at a voltage of 50 V. The electric print recording sheet could be used for several times. When the recorded polyester sheet was heated in an oven at 160° C. for 2 minutes, the sublimation dye was immersed into the polyester film to obtain the image having high wear resistance.

EXAMPLE 7

A tin oxide layer was deposited in a thickness of 2 μm as an electric resistant layer on an aluminum foil having a thickness of 15 μm.

An ink composition was prepared by blending 20 wt. parts of phthalocyanin Blue to 80 wt. parts of paraffin wax having a melting point of 70° C. and dissolving it in carbon tetrachloride. The ink composition was coated on the rear surface of the aluminum foil by the doctor blade to form an ink layer having a thickness of 4 μm whereby the electric print recording sheet was prepared. The recording sheet was superposed to a high quality paper and the ink layer was printed on the high quality paper by feeding the current of 150 mA at a voltage of 2 V through the recording electrode. When the high quality paper was run at a rate of 30 mm/sec. and the electric print recording sheet was run at a rate of 10 mm/sec. to the same direction to record it, excellent image was printed.

Figure 4:
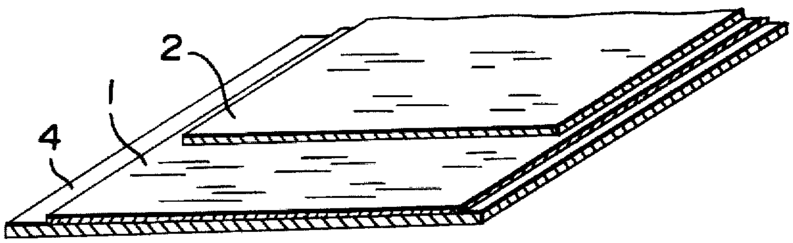
FIG. 4 is a schematic view of a part of the other embodiment of an electric heat recording sheet with the ink layer.
Figure 5:
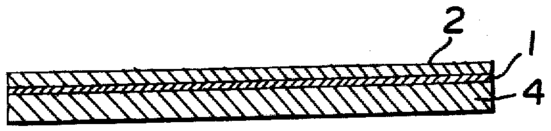
FIG. 5 is a sectional view of an important part of the electric heat recording sheets of FIGS. 4.

FIG. 4 and FIG. 5 show an improved embodiment of the electric heat recording sheet (10) wherein the electric conductive layer (1) and the electric resistant layer (2) are disposed on the dielectric layer (4) of a polymer film.

The polymer films can be polyester film or polyamide film and they have excellent flexibility and easily handled. The sheet having the electric conductive layer and the electric resistant layer in one body has excellent mechanical characteristics of the dielectric layer of the substrate. The electric resistant layer and the electric cnductive layer are adhered whereby the heating characteristic which decides the resolution is excellent.

In accordance with the improved embodiment, the electric heat recording sheet (10) having three layer structure formed by forming the electric conductive layer (1) on the dielectric layer (4) of a polymer film such as polyester film and further coating the electric resistant layer (2) on the electric conductive layer (1) can be provided, whereby the sheet having excellent recording characteristics and durability can be obtained.

In accordance with the present invention, the substrate of the heat recording sheet (10) is formed by the dielectric layer whereby a special configurated electrode arrangement can be provided by selecting desired shape of the electric conductive layer and disposing the electric conductive layer only at desired positions between the dielectric layer and the electric resistant layer. There are various advantages.

The improved embodiment of the electric heating sheet will be further illustrated by certain examples.

EXAMPLE 8

A dielectric layer (4) as the substrate of the heating sheet was a polyester film having a thickness of 6 microns.

Aluminum was deposited on the surface of the dielectric layer (4) to form the electric conductive layer (1) having a thickness of 1 micron. An electric conductive paint was coated on the conductive layer (1) in a thickness of 20 microns to form the electric resistant layer (2).

The electric conductive paint was prepared by dissolving 60 wt. parts of butyral resin and 40 wt. parts of carbon black in ethyl alcohol and the mixture was stirred in a ball mill for 16 hours. The paint had a specific resistance of 10°Ω. cm.

In accordance with the method described referring to FIG. 2, the electric heat recording sheet was superposed on a regular paper or a plastic paper and a DC voltage of 20 V was applied in pulse width of 100 microseconds whereby recording dots having an optical density of more than 0.6 were recorded on the heat sensitive recording paper (13) at a resolution of 6 lines per 1 mm.

EXAMPLE 9

Figure 6:
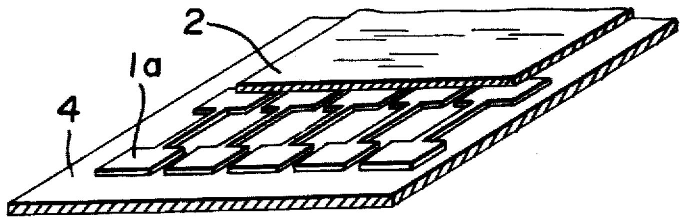
FIG. 6 is a schematic view of the other embodiment of the electric heat recording sheet used in the present invention.

FIG. 6 show one modification.

The electric conductive layer (1*a*) was partially deposited on the dielectric layer to form desired blocked electrodes which was different from the deposition on all surface shown in FIG. 4.

When aluminum was deposit on the dielectric layer (4) of polyester film, a mask made of stainless steel having 5 of rectangular openings having a size of 20 mm×10 mm with a gap of 0.5 mm was covered to deposite aluminum whereby the blocked electric conductive layer (1*a*) was prepared.

The electric resistant layer (2) was coated in a thickness of 20 microns with the electric conductive paint as FIG. 4.

The recording along the electrodes could be attained by using the recording sheet having the blocked electric conductive layer electrodes.

EXAMPLE 10

A polyimide film having a thickness of 12 microns was used as the polymer film for the dielectric layer (4).

An electric conductive paint was prepared by dissolving 90 wt. parts of methyl methacrylate and 10 wt. parts of maleic anhydride in methyl ethyl ketone and dispersing 100 wt. parts of carbon black and polymerizing the monomers to form grafted carbon black; and adding 15 wt. parts of epoxy resin of Epikote 828.

The thermosettable electric conductive paint was coated on the electric conductive layer formed by depositing on the polyimide film to prepare the electric heat recording sheet.

In accordance with the process of Example 8, a DC voltage of 20 V was applied to pass a current of 200 mA for 1 millisecond whereby recording dots having an optical density of more than 0.6 were recorded.

When the electric heat recording sheet was fixed and only the recording paper was run to record, the continuous recording for longer than 10 to 20 minutes could be attained.

When the electric heat recording sheet was disposed on a heat sensitive recording paper together with the electrostatic recording multineedle electrodes and only the recording paper was run, excellent image could be recorded on the recording paper.

What is claimed:

1. An electric recording method which comprises the steps of:
   - placing on a recording medium an electric heat recording sheet having an ink layer and exhibiting electrical resistance;
   - said electric heat recording sheet being comprised of an electrically conductive layer with an electrically resistant layer coated on one side of said electrically conductive layer and said ink layer being coated on the other side of said electrically conductive layer adjacent said recording medium;
   - feeding a current in the electric heat recording sheet by using an electrode which contacts said resistant layer, the current passing through said electrically resistant layer and said electrically conductive layer in said electric heat recording sheet being converted to Joule heat to heat said ink layer to a state suitable for printing; and
   - printing the ink on the recording medium depending upon the latent heat image formed on the surface of said electrically resistant layer by said electrode.

2. An electric heat recording sheet which comprises an electric conductive layer; an electric resistant layer which is adhered on one surface of the electric conductive layer to be heated by feeding a current from an electrode; and an ink layer formed on the other surface of the electric conductive layer;
   - said ink layer being printable onto a recording medium after exposure to heat conductance from said electric resistant layer and said electric conductive layer.

3. An electric heat recording sheet according to claim 2 wherein the electric conductive layer is a metal deposited film.

4. An electric heat recording sheet according to claim 2 wherein the electric conductive layer is an electric conductive sheet.

5. An electric heat recording sheet according to claim 2 wherein the electric conductive layer is a metal foil.

6. An electric heat recording sheet according to claim 2 wherein an ink layer comprises a vehicle and a pigment or a sublimation dye.

7. An electric heat recording sheet according to claim 2 wherein the electric resistant layer is a coated film prepared by dispersing electric conductive fine particles in a binder.

8. An electric heat recording sheet according to claim 7 wherein the conductive fine particles are semiconductive zinc oxide, semiconductive titanium dioxide, copper iodide or carbon black and the binder is butyral resin, polycarbonate, acrylic resin, or methacrylic resin.

9. An electric heat recording sheet which comprises:
   - an electric conductive layer wherein the electric conductive layer is formed as blocked electrodes;
   - an electric resistant layer which is adhered on one surface of the electric layer to be heated by feeding a current; and
   - a dielectric layer of a polymer film which is formed on the rear surface of the electric conductive layer and located adjacent a heat sensitive recording medium whereby an electrical signal applied to said heat recording sheet will be recorded onto said heat sensitive recording medium; said dielectric layer adding durability to and increasing the recording capability of said heat sensitive recording medium.

10. An electric heat recording sheet according to claim 9 wherein the polymer film is polyester film or polyimide film.

11. An electric heat recording sheet comprising:
    - an electrically conductive layer with an electrically resistant layer formed on one side of said electrically conductive layer and an ink layer formed on the other side of said electrically conductive layer; said electrically conductive layer and said electrically resistant layer supplying heat to said ink layer when an electrode touching said electrically resistant layer passes current therethrough to said electrically conductive layer; said ink layer when heated being printed onto a recording medium.

12. A method of forming a visible image onto a recording medium comprising the steps of:
    - coating an electrically resistant layer onto one side of an electrically conductive layer;
    - forming an ink layer onto the other side of said electrically conductive layer adjacent said recording medium;

contacting selected portions of the surface of said electrically resistant layer with a recording electrode to form a latent image thereon;

supplying a current through said electrically resistant lyer and said electrically conductive layer to heat said ink layer to the melting point in those areas where the latent image is formed; and printing said ink layer onto said recording medium to form a visible image of said latent image.

* * * * *